US006922158B2

(12) United States Patent
Ymker

(10) Patent No.: US 6,922,158 B2
(45) Date of Patent: Jul. 26, 2005

(54) HYDRAULIC CYLINDER WITH A MEASURING SYSTEM FOR DETERMINING THE ABSOLUTE POSITION OF THE PISTON ROD RELATIVE TO A REFERENCE POINT

(75) Inventor: Leo Ymker, TJ Oss (NL)

(73) Assignee: Bosch Rexroth AG, Lohr/Main (DE)

( * ) Notice: Subject to any disclaimer, the term of this patent is extended or adjusted under 35 U.S.C. 154(b) by 0 days.

(21) Appl. No.: 10/475,247

(22) PCT Filed: Apr. 12, 2002

(86) PCT No.: PCT/EP02/04096

§ 371 (c)(1),
(2), (4) Date: Apr. 5, 2004

(87) PCT Pub. No.: WO02/086330

PCT Pub. Date: Oct. 31, 2002

(65) Prior Publication Data

US 2004/0155800 A1 Aug. 12, 2004

(30) Foreign Application Priority Data

Apr. 23, 2001 (DE) ........................ 101 19 941

(51) Int. Cl.⁷ .............................. H03M 1/22
(52) U.S. Cl. ...................................... 341/15
(58) Field of Search ................... 341/15; 428/632, 428/633, 666, 680; 501/127, 134; 164/151.1–151.2, 151.3, 155.5

(56) References Cited

U.S. PATENT DOCUMENTS 3,956,973 A   5/1976   Pomplas
5,077,139 A   12/1991  Van Der Heyden

FOREIGN PATENT DOCUMENTS

| DE | 3910725 | 10/1990 |
|---|---|---|
| DE | 4027199 | 1/1991 |
| DE | 4205048 | 8/1993 |
| EP | 0618373 | 10/1994 |
| FR | 2795509 | 12/2000 |
| WO | 9501510 | 1/1995 |

OTHER PUBLICATIONS

Patent Abstracts of Japan; JP 11215682, Aug. 10, 1999, 10034165 Jan. 30, 1998, Tokico Ltd, Matsui Yoshimasa et al.
Patent Abstracts of Japan; JP 04155201 May 28, 1992, 02280099 Oct. 18, 1990, SMC Corp. Fujiwara Nobuhiro, et al.

*Primary Examiner*—Jean Bruner Jeanglaude
(74) *Attorney, Agent, or Firm*—Martin A. Farber

(57) ABSTRACT

The invention is based on a pressure-medium cylinder having a piston which has a piston rod, and having a measuring system for determining the absolute position of the piston rod relative to a reference point. Firstly, the measuring system has a code track of binary code elements which is applied to the piston rod and runs along the piston rod, which code elements are formed by grooves and plateaus which run in the circumferential direction in a magnetically conductive base material, which is coated with a protective layer, of the piston rod, and, secondly, the measuring system has a sensor which is in a fixed position relative to the reference point and has two or more sensor elements, which are arranged along the code track and each scan a limited number of code elements. The desired aim for a pressure-medium cylinder of this generic type and according to the invention can be achieved in that the code elements in the code track on the piston rod are arranged in an irregular pattern, which in each case produces a unique pattern of the output signals from the sensor elements for different positions of the piston rod, and in that the grooves and plateaus in the piston rod form, at least in wide areas, a Manchester Code, in which at most two code elements of the same state follow one another. The use of a Manchester Code ensures that the diameter of the base material of the piston rod, determined over limited sections, is essentially the same over the entire length of the code track.

13 Claims, 5 Drawing Sheets ly based on Germany Application No. 10119941.4,
HYDRAULIC CYLINDER WITH A MEASURING SYSTEM FOR DETERMINING THE ABSOLUTE POSITION OF THE PISTON ROD RELATIVE TO A REFERENCE POINT

CONTINUING DATA

This application is the national phase under 35 U.S.C. 371 of PCT International No. PCT/EP02/04096 which has an International filing date of Apr. 12, 2002 which claims priority based on Germany Application No. 10119941.4, filed on Apr. 23, 2001.

FIELD AND BACKGROUND OF THE INVENTION

The invention relates to a pressure-medium cylinder with a measuring system for determining the position of the piston rod relative to a reference point, and having further features.

A pressure-medium cylinder such as this is known from EP 0 618 373 B1. The measuring system for position determination is in this case designed such that only a relative position, that is to say only a movement distance, can be detected, without it being possible to identify the absolute position of the piston rod. The piston rod in the known pressure-medium cylinder has a regular code track of successive code elements of different binary states, which are formed by circumferential grooves of specific width and by circumferential plateaus, whose widths are the same as those of the grooves, between two grooves. In order to protect the piston rod, which is composed of steel in the base material, and to produce a smooth surface, a thin ceramic layer is applied to the base material and is finally processed by grinding and polishing.

The measuring system is a system based on a galvano-magnetic effect and has, in a fixed position with respect to the housing of the pressure-medium cylinder, a permanent magnet which produces a magnetic field and two magnetoresistive sensor elements, which are located between the permanent magnet and the piston rod and which are subjected to alternating magnetic field strengths during the movement of the piston rod as a result of the grooves and plateaus as they move past the sensor elements, and which accordingly emit a sequence of alternating output signals. Two sensor elements are provided, which are at a distance from one another in the longitudinal direction of the piston rod that is equal to an integer multiple of the pitch of the code track plus or minus a quarter of the pitch, so that high resolution is possible.

SUMMARY OF THE INVENTION

The invention is based on the object of developing a pressure-medium cylinder which has features such that it is possible to determine the absolute position, in which case the production effort is still restricted and reliable operation can be guaranteed over a long life.

The desired aim for a pressure-medium cylinder of this generic type and according to the invention can be achieved in that in order to determine the absolute position of the piston rod, the code elements in the code track on the piston rod are arranged in an irregular pattern, which in each case produces a unique pattern of the output signals from the sensor elements for different positions of the piston rod, and wherein the grooves and plateaus in the piston rod form, at least in wide areas, a Manchester Code, in which at most two code elements of the same state follow one another. The use of a Manchester Code ensures that the diameter of the base material of the piston rod, determined over limited sections, is essentially the same over the entire length of the code track. This leads to the protective layer having a uniform structure, and generally being a ceramic layer which is applied by gas flame spraying. Overall, this makes it possible to produce a piston rod that has the same diameter over its entire length, with little effort. There is no need to remove or apply more material for the protective layer at any point—the grooves and plateaus are averaged out—than at any other point.

Advantageous refinements of a pressure-medium cylinder according to the invention are herein.

According to further features an irregular pattern of code elements is advantageously obtained wherein the code track on the piston rod is composed of code words which are each formed from an equal number of binary code elements and which all have a start code, which is formed from a specific number of code elements, and, following this, an individual position code, which comprises a sequence of code elements which is specific only to that particular code word, wherein the arrangement of the sensor elements of the sensor extends at least over the length of an entire code word, and wherein the number of sensor elements within the length of a code word is at least as great as the number of code elements in the code words.

The code track is scanned particularly accurately if, according to a further feature the number of sensor elements within a specific length of the code track is not exactly equal to the number of code elements but is an integer multiple of the number of code elements within the length. In this case, with regard to the number of sensor elements required, it has also been found to be advantageous to provide two sensor elements for each code element.

According to another feature the row of sensor elements is at least as long as one code word plus one start code, that is to say, it may extend over a total of two start codes and one position code. This allows resolution not just to the length of one code word, but down to the width of a code element. However, the row of sensor elements is preferably longer than one code word plus one start code, and is in particular 130% of one code word, which, owing to the redundancy, opens up additional capabilities for the monitoring of the code track and for correction of errors, and thus for improving the reliability during operation.

In principle, the code words may also have different start codes for the same number of code elements for each start code. However, it appears to be simpler if, according to yet another feature the start code is the same for all code words.

According to still another feature only the position code of a code word is a Manchester Code, so that the start code can be clearly distinguished from the code element sequence within a position code by means of at least three immediately successive code elements of the same state.

The sensor elements are, according to another feature advantageously Hall elements, which are subjected to the field from a permanent magnet which, in particular, is composed of the rare earth metal neodymium. Further advantageous refinements of the sensor invention are provided.

In order to further improve the reliability during operation, it is possible, to arrange two or more sensors distributed around the piston rod.

BRIEF DESCRIPTION OF THE DRAWINGS

An exemplary embodiment of a pressure-medium cylinder according to the invention is illustrated in the drawings.

The invention will now be explained in more detail with reference to the figures in these drawings, in which.

DETAILED DESCRIPTION OF THE PREFERRED EMBODIMENT

Figure 1:
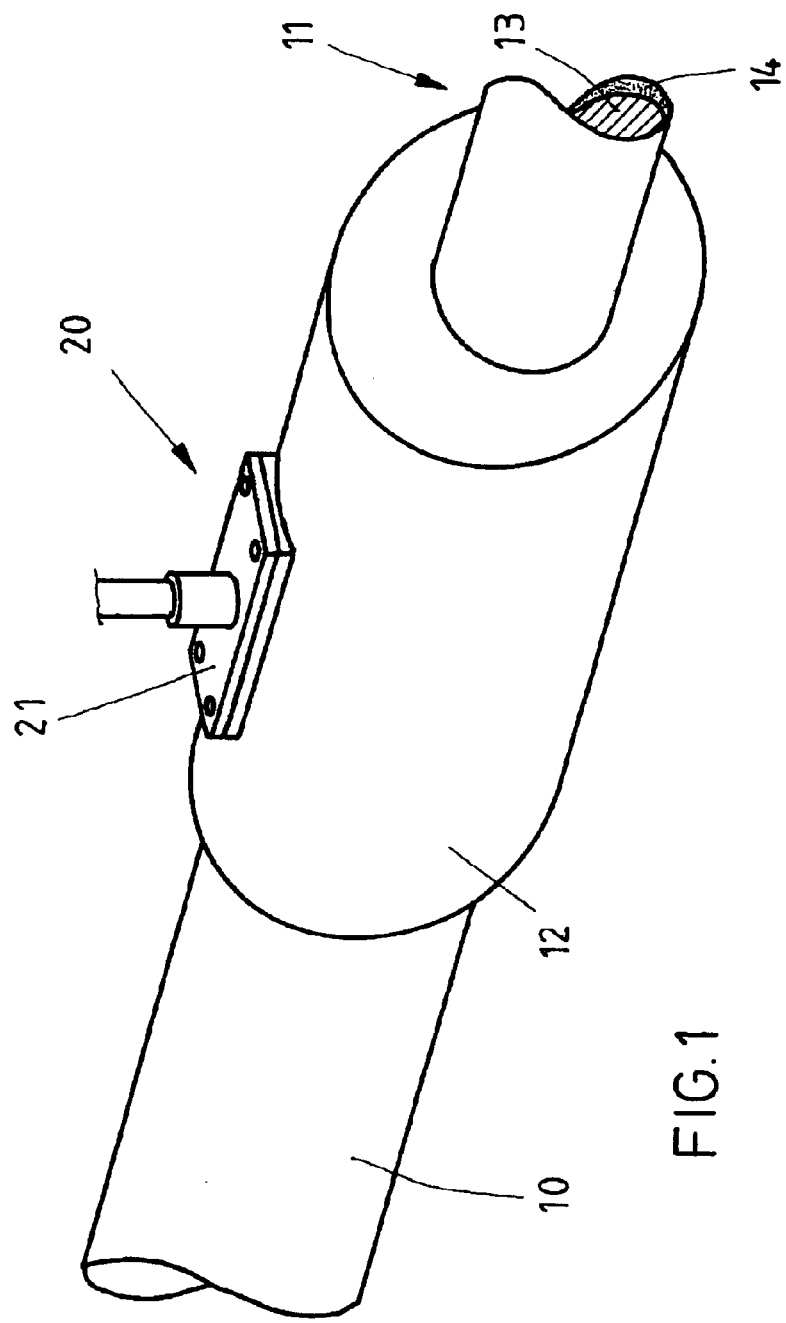
FIG. 1 shows a perspective partial view of the pressure-medium cylinder.
Figure 2:
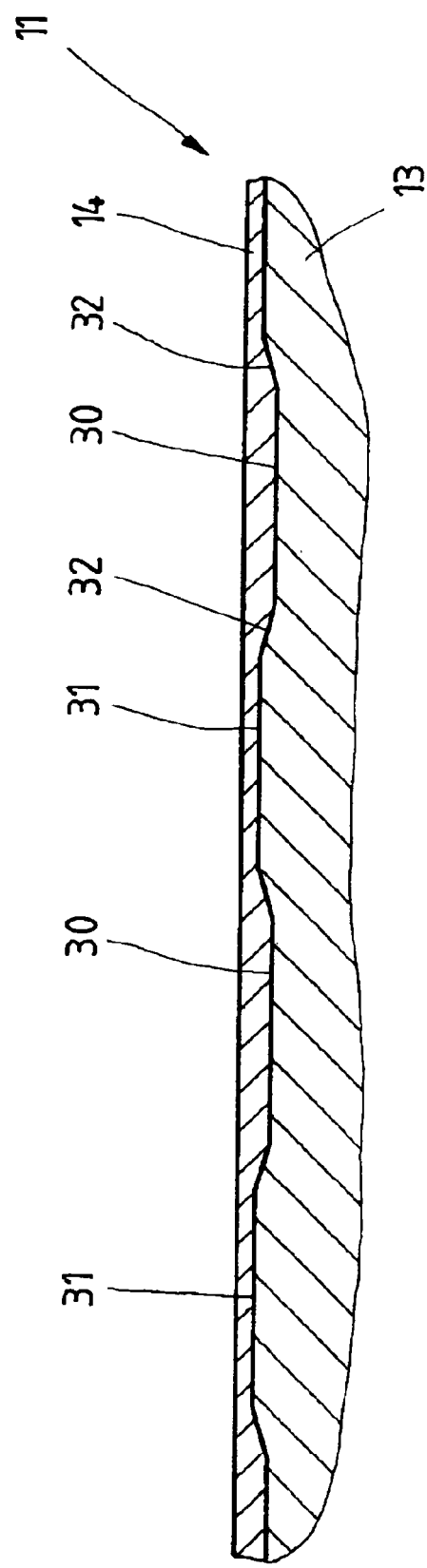
FIG. 2 shows a partial longitudinal section through the piston rod of the pressure-medium cylinder shown in FIG. 1.

The pressure-medium cylinder shown in FIG. 1 has a cylinder housing 10 in which a piston, which is not illustrated there in more detail, is located in a generally known manner. The piston is attached to a piston rod 11, which passes out of the interior of the cylinder housing through a cylinder head 12 to the exterior, with a seal being formed. The piston rod predominantly comprises a steel core 13 and is, as is known by way of example from DE 39 10 725 C1 or from U.S. Pat. No. 5,077,139, coated with a thin ceramic, and thus nonmagnetic, protective layer 14. This is applied, for example, by gas flame spraying of ceramic powder.

A sensor 20 with a housing 21 is inserted into the cylinder head 12 and is used to detect the absolute position of the piston rod 11. The sensor is located in front of the sealing arrangement between the piston rod and the cylinder head, and is thus not subjected to pressure.

For position detection, the steel core 13 of the piston rod 11 is provided with a code track which runs along the piston rod and whose binary code elements are formed by grooves 30, which run circumferentially in radial planes, and by circumferential webs or plateaus 31. The steel core 13 has its maximum diameter on the plateaus. In contrast, the depth of the grooves is approximately 0.3 mm. The grooves and the plateaus have the same width of 5.2 mm, with immediately successive grooves or plateaus appearing as a groove or plateau with a width which is an integer multiple of the pitch of 5.2 mm. The grooves and the plateaus merge into one another in flanks 32 that are in the form of truncated cones and whose size in the longitudinal direction of the piston rod is 1 mm, so that half of one flank may be regarded as being associated with a plateau 31, with the other half being regarded as being associated with a groove 30. In theory, the code track can be regarded as a rectangular profile whose step width, as mentioned, is 5.2 mm. The flanks mean that the thickness of the ceramic protective layer 14 does not change abruptly, but gradually, so that this reduces the risk of crack formation. Apart from this, the thickness of the protective layer 14 in the areas of the maximum diameter of the steel core 13 is approximately 0.2 to 0.3 mm, and it is approximately 0.5 to 0.6 mm in the area of the grooves 30.

Figure 3:
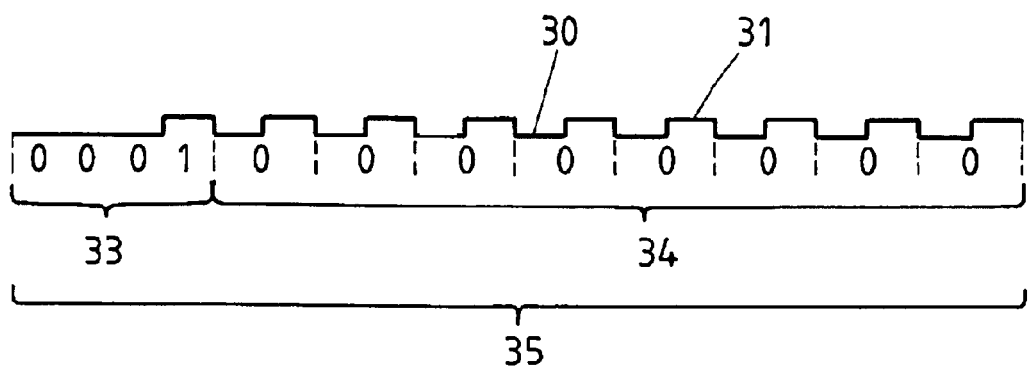
FIG. 3 shows a code word, which has a start code and a position code, on the code track on the piston rod, with the dual number of the position code being shown using the Manchester Code.
Figure 4:
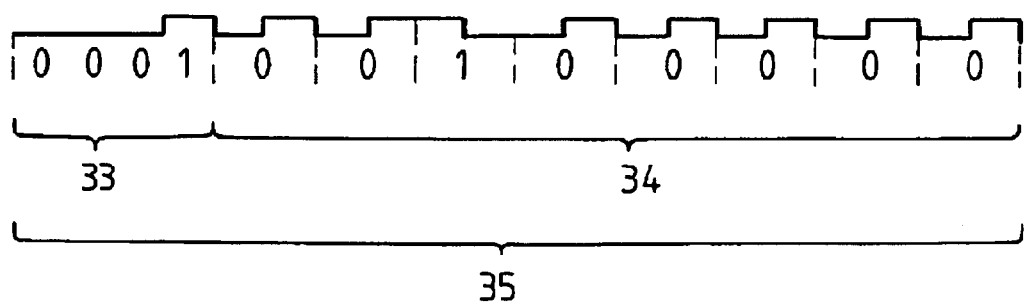
FIG. 4 shows a second code word on the code track.
Figure 5:
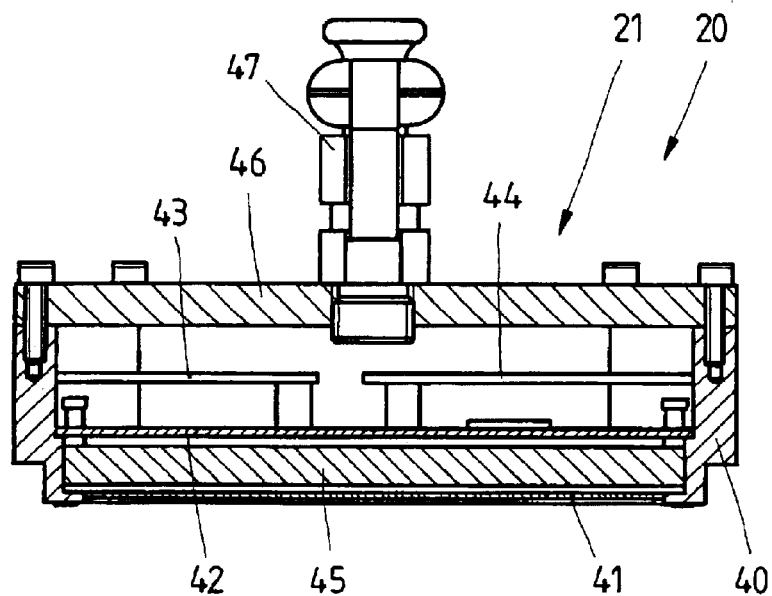
FIG. 5 shows a section in the longitudinal direction of the piston rod through the housing of the sensor.
Figure 6:
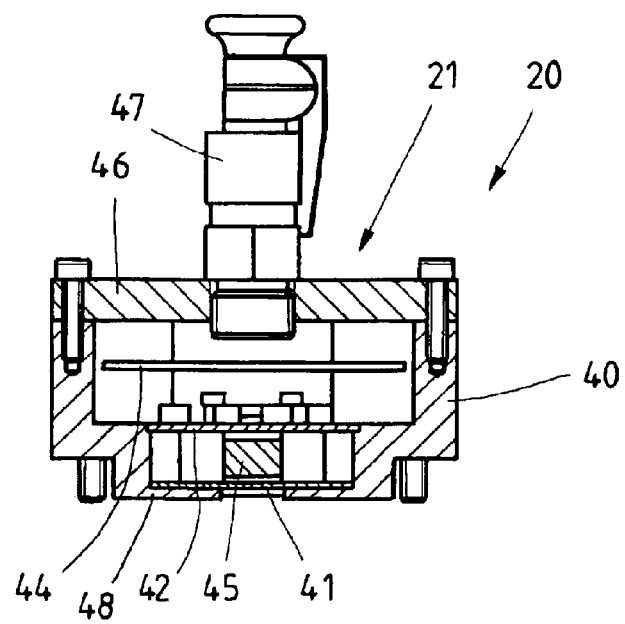
FIG. 6 shows a cross section through the housing of the sensor.

The grooves 30 and the plateaus 31 are combined to form binary code words 35, which comprise a start code 33, which is the same for all code words and whose coding is 0001, and a position code 34 which differs from one code word to the next. The position codes are binary Manchester Codes with eight double bits, and are derived from the sequential decimal numbers 0 to 255. A double bit 01 in the Manchester Code means the number 0, and a double bit 10 in the Manchester Code means the number 1 of a dual number. As a result of this, at most two successive code elements of the same state may occur in the Manchester Code. For example, the sequence of grooves 30 and plateaus 31 illustrated in FIG. 3 is then produced for the code word 0, with a groove representing the binary 0, and a plateau representing the binary 1. The code elements 0001 follow one another in the start code 33. The start code 33 is followed by the considerably longer position code 34, with the eight identical double bits 01. Grooves 30 and plateaus 31 thus alternate in the position code of the code word 0. The decimal number 0 is illustrated as the dual number 00000000 underneath the profile of the position code. By way of example, the code word for the decimal number 4 is the sequence of grooves 30 and plateaus 31 illustrated in FIG. 4. As can be seen from FIG. 4, the code word has two plateaus followed immediately by two grooves. In general, it can be stated that at most two code elements of the same state, that is to say at most two binary zeros or two binary ones, will follow one another in the Manchester Code. This means that a start code can be distinguished easily when it is followed by three code elements of the same state. Other possible start codes are, for example, 001110 or 000111, or the inverse of them.

The choice of three, and only three, successive code elements of the same state in the start code and, in particular, the choice of the Manchester Code for the position code, which is longer than the start code, means that the steel core 13 of the piston rod has the same average diameter over its entire length. With the protective layer 14 also on average having the same thickness, this leads with relatively little production effort to a piston rod which has the same diameter over its entire length, so that it is simple to seal it in the cylinder head.

As stated, each code word comprises 20 code elements, which all extend over a distance of 5.2 mm in the longitudinal direction of the piston rod 11. One code word thus has a length of 104 mm. If there are 256 code words, this results in a coded piston rod length of 26.624 m.

The housing 21 of the sensor 20 comprises a box-shaped base part 40, which is produced from aluminum and in which two or more electronics boards 41, 42, 43 and 44 and a permanent magnet 45 in the form of a rod are accommodated, and the housing 21 of the sensor 20 also has a steel cover 46, to which an electrical plug 47 is fitted and which is used as a magnetic shield against external magnetic interference. The base part 40, whose base 48 is as thin as possible with a thickness of, for example, 0.5 mm, and which is produced from aluminum, provides no magnetic shielding, but is recessed in the cylinder head 12, which acts as a shield. The permanent magnet is a neodymium magnet and extends in the longitudinal direction of the piston rod 11 when the sensor is mounted on the pressure-medium cylinder.

Figure 7:
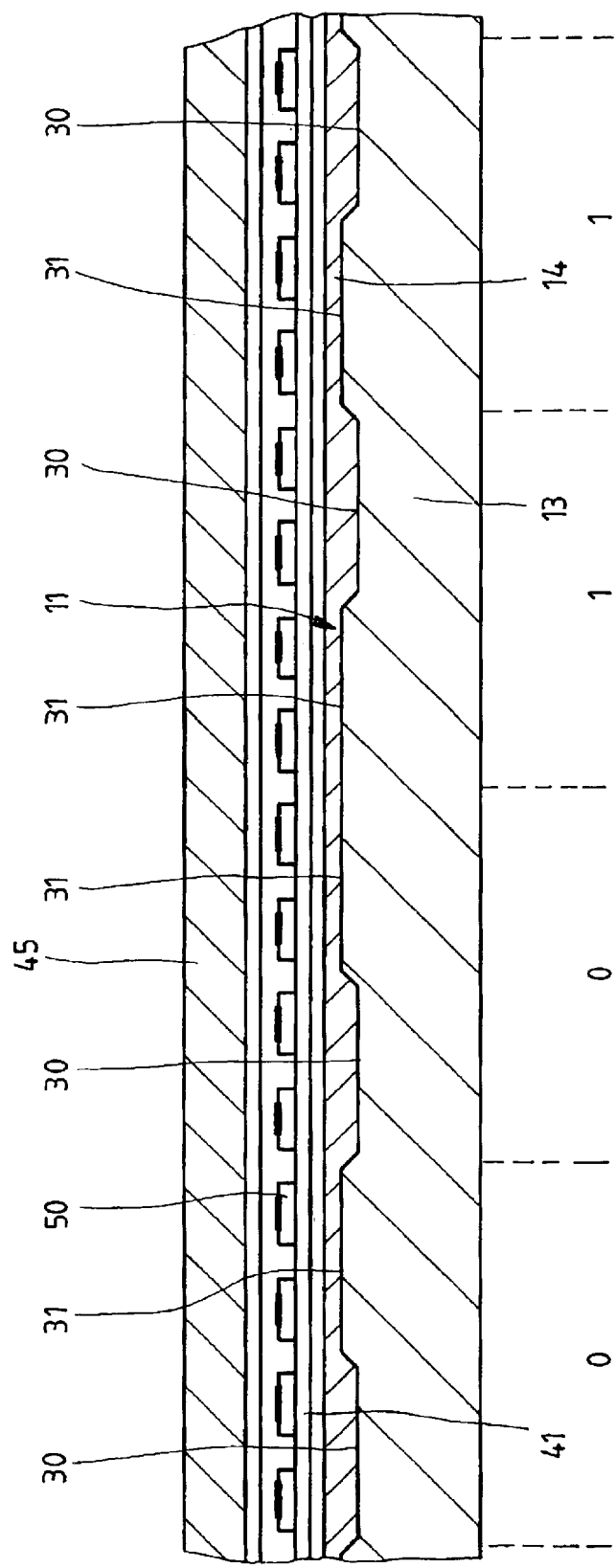
FIG. 7 shows, schematically, the association between the sensor elements and the code elements in the code track when the piston rod is in one specific position.

The code track on the piston rod 11 is scanned by a total of fifty-two sensor elements 50, which are in the form of Hall elements and are arranged in one or two rows, offset with respect to one another, on the board 41 (which is located between the permanent magnet 45 and the base 48) underneath the permanent magnet and, when in the in-use position, are arranged as close as possible on the piston rod, in order that the difference in the field strength across one groove and across one plateau is as great as possible. The distance between the Hall elements 50 in the longitudinal direction of the piston rod is 2.6 mm. Thus, as is shown in FIG. 7, two sensor elements are each associated with one code element 30 or 31. Forty Hall elements 50 are required to scan the twenty bits of one code word, thus resulting in a redundancy of twelve Hall elements, and of 30%. This redundancy makes it possible to scan not only an entire code word but also three further Manchester double bits or a start code and a further Manchester double bit.

Multiplexers for checking the Hall elements are also located on the board 41. The board 42 is fitted with A/D converters and microcontrollers. The board 43 also ensures that the supply voltage for the Hall elements is regulated. Finally, the board 44 is a CAN-bus board.

During operation, the pattern of the grooves 30 and of the plateaus 31 can be determined by using the fifty-two Hall elements 50. Since the piston rod 11 is provided with a set of unique code words, the absolute position of the piston rod can be identified by reading the code word. Each code word has a length of 104 mm, so that the determination of the word over which the row of Hall elements is positioned results in the absolute position in units of 104 mm. Furthermore, the absolute position can be determined down to the width of one bit by using the start code 33 of a code word, and this corresponds to a resolution of 5.2 mm. The resolution can be improved further by determining the position of the transitions from 0 to 1 and from 1 to 0 between the grooves and plateaus by interpolation of the transitions which are detected by the row of Hall elements. This allows a resolution of down to 0.3 mm.

I claim:

1. A pressure-medium cylinder comprising
a piston which has a piston rod (11), and
a measuring system for determining the position of the piston rod (11) relative to a reference point, the measuring system having a code track of binary code elements (30, 31) which code track is applied to the piston rod (11) and extends along the piston rod (11), said code elements (30, 31) being formed by grooves (30) and plateaus (31) which run in circumferential direction in a magnetically conductive base material (13) of the piston rod (11), which base material is coated with a protective layer (14), and the measuring system having a sensor (20) which is in a fixed position relative to the reference point and has several sensor elements (50) which are arranged along the code track and each scan a limited number of code elements (30, 31),
wherein for determining the absolute position of the piston rod (11), the code elements (30, 31) in the code track on the piston rod (11) are arranged in an irregular pattern, which for different positions of the piston rod in each case produces a unique pattern of output signals from the sensor elements (50), and wherein
the grooves (30) and plateaus (31) in the piston rod form, at least in wide areas, a Manchester Code, by which at most two code elements (30, 31) of same state follow one another.

2. The pressure-medium cylinder as claimed in claim 1, wherein the code track on the piston rod (11) is composed of code words (35) which are each formed from an equal number of binary code elements (30, 31) and which all have a start code (33), which is formed from a specific number of code elements (30, 31), and, following this, an individual position code (31), which comprises a sequence of code elements (30, 31) which is specific only to that particular code word (35), wherein the arrangement of the sensor elements (50) of the sensor (20) extends at least over length of an entire code word (35), and wherein a number of sensor elements (50) within a length of a code word (35) is at least as great as number of code elements. (30, 31) in the code words (35).

3. The pressure-medium cylinder as claimed in claim 1, wherein number of sensor elements (50) within a specific length of the code track is an integer multiple of number of code elements (30, 31) within the length.

4. The pressure-medium cylinder as claimed in claim 3, wherein there are twice as many sensor elements (50) as code elements (30, 31) within the specific length, and distance between the sensor elements (50) is thus half as great as that between the code elements (30, 31).

5. The pressure-medium cylinder as claimed in claim 4, wherein a row of sensor elements (50) is at least as long as one code word (35) plus one start code (33).

6. A The pressure-medium cylinder as claimed in claim 5, wherein a row of sensor elements (50) is longer than one code word (35) plus one start code (33), preferably 130% of one code word (35).

7. The pressure-medium cylinder as claimed in claim 2, wherein the start code (33) is same for all the code words (35) on the code track on the piston rod (11).

8. The pressure-medium cylinder as claimed in claim 2, wherein only position code (34) is a Manchester Code, and wherein the start code (33) has at least three immediately successive code elements (30) of same state.

9. The pressure-medium cylinder as claimed in claim 1, wherein the sensor elements (50) are Hall elements, which are subjected to a field from a permanent magnet (45) which, in particular, is composed of rare earth metal neodymium.

10. The pressure-medium cylinder as claimed in claim 9, wherein a housing (21) together with the sensor elements (50) and associated electronics are arranged in cylinder head (12).

11. The pressure-medium cylinder as claimed in claim 10, wherein the housing (21) has a base part (40) composed of aluminum, into which the sensor elements (50), the permanent magnet (45) and various electrical printed circuit boards (41, 42, 43, 44) are inserted, and has a cover (46) composed of steel.

12. The pressure-medium cylinder as claimed in claim 1, wherein at least two sensors are arranged distributed around the piston rod.

13. The pressure-medium cylinder as claimed in claim 5, wherein a row of sensor elements (50) is longer than one code word (35) plus one start code (33).

* * * * *